(12) United States Patent
Högnabba et al.

(10) Patent No.: US 6,843,379 B2
(45) Date of Patent: Jan. 18, 2005

(54) CORROSION-RESISTANT FILTER ELEMENT

(75) Inventors: Olli Högnabba, Kirkkonummi (FI); Gregg W. Grume, Phelps, NY (US)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/236,591

(22) Filed: Sep. 6, 2002

(65) Prior Publication Data

US 2003/0010709 A1 Jan. 16, 2003

Related U.S. Application Data

(63) Continuation of application No. 09/395,587, filed on Sep. 14, 1999, now abandoned.

(51) Int. Cl.$^7$ .............................................. B01D 29/33
(52) U.S. Cl. .................. 210/486; 210/506; 210/500.27; 210/495
(58) Field of Search ................................ 210/483, 495, 210/510.1, 506, 502.1, 504, 486, 500.27, 490, 499, DIG. 6, DIG. 7, 331, 346; 55/523–524; 162/251, 278, 279

(56) References Cited

U.S. PATENT DOCUMENTS

| 887,349 | A | 5/1908 | Sellensheidt | |
|---|---|---|---|---|
| 2,715,453 | A | 8/1955 | Lange | 183/44 |
| 2,877,863 | A | 3/1959 | Lurie | 183/49 |
| 2,965,197 | A | 12/1960 | Dow et al. | 183/44 |
| 3,003,581 | A | 10/1961 | Greason | 183/49 |
| 3,154,393 | A | 10/1964 | Klein et al. | 55/501 |
| 3,382,985 | A | 5/1968 | Muehl | 210/495 |
| 3,645,072 | A | 2/1972 | Clapham | 55/387 |
| 3,744,641 | A | * 7/1973 | Schmidt, Jr. | 210/486 |
| 3,747,773 | A | 7/1973 | Jackson | 210/495 |
| 4,040,935 | A | 8/1977 | Argade et al. | 204/256 |
| 4,045,348 | A | 8/1977 | Strub | 210/230 |
| 4,053,385 | A | 10/1977 | Hirozawa | 204/254 |

(List continued on next page.)

FOREIGN PATENT DOCUMENTS

JP 7-227513 A 9/1995

OTHER PUBLICATIONS

Hawley's Condensed Chemical Dictionary (Lewis, Sr., Richard, 13$^{th}$ ed., John Wiley & Sons, Inc., p. 906).*
"Sulfur Dioxide" (Ullmann's Encyclopedia of Industrial Chemistry, under section 8. "Construction Materials", pp. 1–2, copyright 2002, Wiley–VCH Verlag GmbH & Co.KgaA).*
Hawley's Condensed Chemical Dictionary (Lewis, Richard Sr., 13$^{th}$ ed., pp. 791, 904, 908 and 1062).
Derwent English Abstract of JP 07227513–A.

*Primary Examiner*—Terry K. Cecil
(74) *Attorney, Agent, or Firm*—Morgan & Finnegan, LLP

(57) ABSTRACT

The invention relates to a filter element with improved corrosion and heat resistance and structural properties to be used in filtering solids containing material in order to achieve a filter cake of solid material on at least one external surface area of the filter element. According to the invention, at least one part of the external surface area of the filter element separated from the external surface area for forming the filter cake is provided with at least one corrosion and heat resistant polymer-based material.

22 Claims, 2 Drawing Sheets

U.S. PATENT DOCUMENTS

Figure 3:
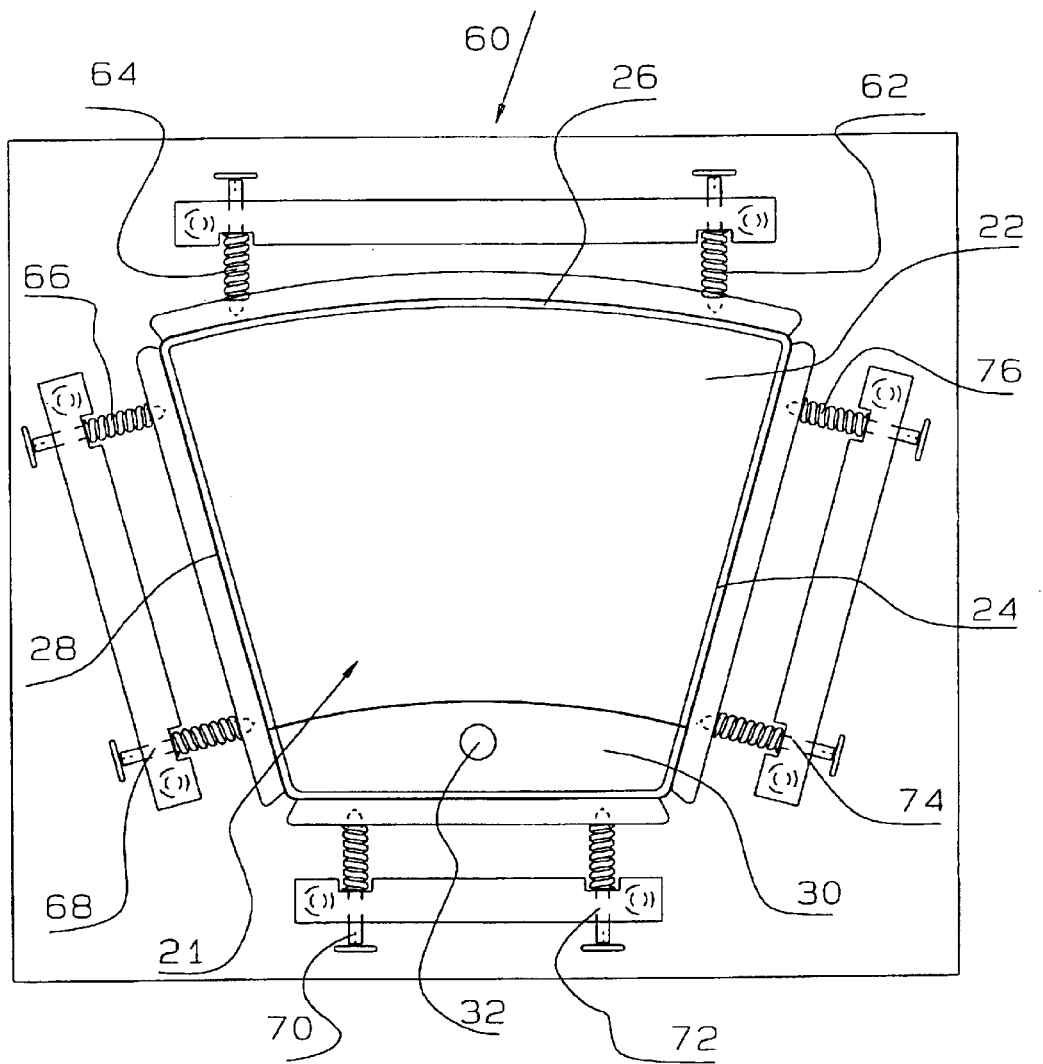

| | | | |
|---|---|---|---|
| 4,347,208 A * | 8/1982 | Southall | 264/229 |
| 4,422,861 A | 12/1983 | Dusza | 55/498 |
| 4,530,972 A * | 7/1985 | Tatemoto et al. | 525/276 |
| 4,543,187 A | 9/1985 | Steppacher | 210/232 |
| 4,632,959 A | 12/1986 | Nagano | 525/70 |
| 4,671,873 A | 6/1987 | Keller | 210/232 |
| 4,725,347 A | 2/1988 | Pimlott | 204/254 |
| 4,737,257 A | 4/1988 | Boulton | 204/291 |
| 4,774,000 A | 9/1988 | Kawai et al. | 210/321.6 |
| 4,874,516 A | 10/1989 | Kondo | 210/490 |
| 4,886,689 A | 12/1989 | Kotliar et al. | 428/35.7 |
| 4,931,178 A | 6/1990 | Manniso et al. | 210/228 |
| 4,943,473 A | 7/1990 | Sahatjian et al. | 428/245 |
| 4,950,403 A | 8/1990 | Hauff et al. | 210/486 |
| 4,956,088 A * | 9/1990 | Hindstrom | 210/327 |
| 4,981,589 A | 1/1991 | Hindström et al. | 210/490 |
| 5,051,474 A | 9/1991 | Warren et al. | 525/131 |
| 5,075,160 A * | 12/1991 | Stinton et al. | 442/247 |
| 5,096,473 A | 3/1992 | Sassa et al. | 55/97 |
| 5,176,727 A | 1/1993 | Ezaki et al. | 55/523 |
| 5,316,678 A | 5/1994 | Heaslip | 210/486 |
| 5,415,775 A | 5/1995 | Castillon et al. | 210/490 |
| 5,454,845 A | 10/1995 | Anahara et al. | 55/267 |
| 5,505,757 A | 4/1996 | Ishii | 55/523 |
| 5,560,874 A | 10/1996 | Sheckler et al. | 261/122.1 |
| 5,688,600 A | 11/1997 | Bailey, Jr. | 428/421 |
| 5,785,851 A * | 7/1998 | Morris et al. | 210/489 |
| 5,804,280 A * | 9/1998 | Pall et al. | 428/137 |
| 5,873,999 A | 2/1999 | Gaiser | 210/488 |
| 5,925,244 A * | 7/1999 | O'Rourke | 210/232 |
| 5,981,614 A * | 11/1999 | Adiletta | 521/145 |
| 6,132,608 A | 10/2000 | Sale et al. | 210/228 |
| 6,153,303 A | 11/2000 | Namura et al. | 428/421 |
| 2003/0080043 A1 * | 5/2003 | Renganath et al. | 210/347 |

* cited by examiner

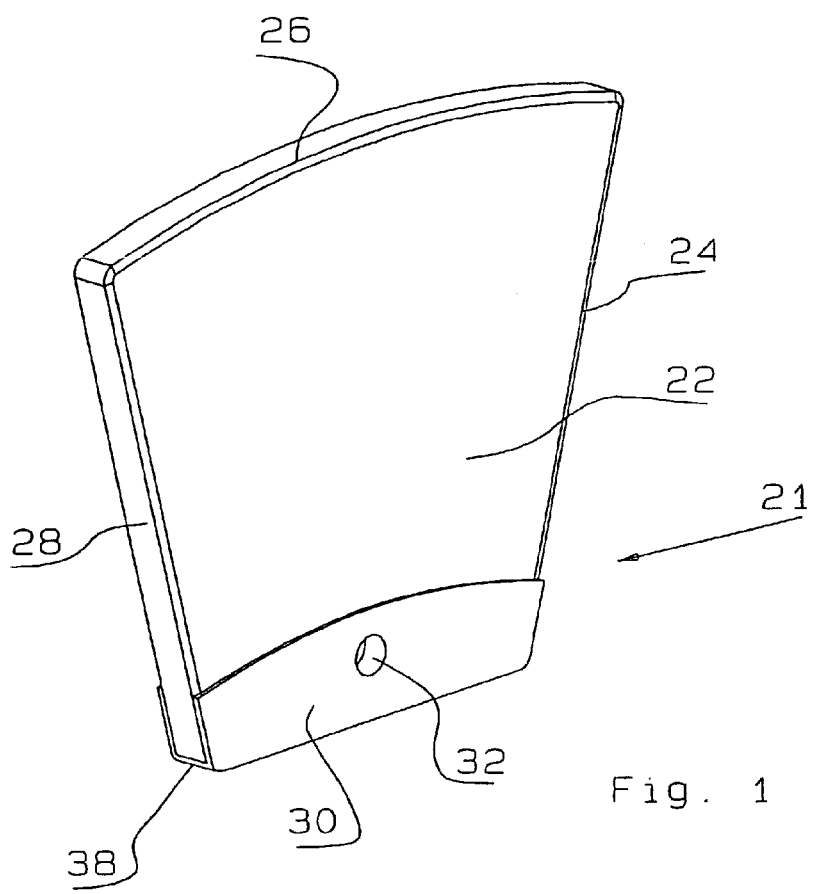
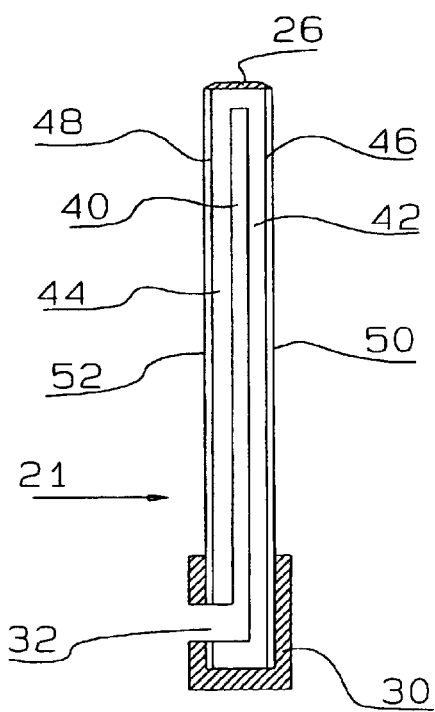

CORROSION-RESISTANT FILTER ELEMENT

This is continuation of application Ser. No. 09/395,587, filed Sep. 14, 1999, now abandoned, and claims priority thereto.

This invention relates to a filter element with improved corrosion resistance and structural properties to be used in filtering solids containing material in order to achieve a filter cake of solid material on at least one surface of the filter element.

Filter bodies with membrane coatings are well known to those skilled in the art. For instance, the U.S. Pat. No. 5,560,874 discloses a partially coated permeable ceramic substrate; two coatings are utilized in the process of this patent and are deposited onto the substrate. Filter bodies are also often used in filter plate assemblies for capillary driers, as described in the U.S. Pat. No. 4,981,589.

Filter plates used in drying assemblies often must withstand severe corrosive environments. Thus, for instance, they may be exposed to concentrated acids at elevated temperatures such as concentrated sulphuric acid and concentrated nitric acid at a temperature in excess of 90° C. Exposure to such acids is often encountered in hydrometallurgical processes. Filter plates are also often subjected to hot caustic in hydrometallurgical processes or in the paper making field. Further, filter plates are used to filter waste streams containing abrasive material.

The filter plates used do not have adequate abrasion resistance. The materials which have sufficient porosity to allow the passage of a filtrate frequently do not have sufficient chemical resistance to the liquid being filtered. One solution to this problem is described in the U.S. Pat. No. 5,415,775 in which patent it is disclosed that ". . . the ends of the supports or of the membranes are made leaktight by a thin film of a thermoplastic or a thermofusible polymer. The polymer is deposited by any suitable known technique such as by coating with a polymer suspension, by an electrostatic process or by direct deposition by means of a fluidized bed of polymer powder followed by heat treatment."

The U.S. Pat. No. 5,415,775 is directed to a porous monolithic ceramic support, and the process of this patent works well with such porous monolithic ceramic support. However, when the process of the U.S. Pat. No. 5,415,775 is attempted to be used with a ceramic support which is not monolithic, it is an abject failure. The polymeric material does not adhere well to all of the surfaces of the support to which it is applied.

The object of this invention is to eliminate some drawbacks of the prior art and to achieve a filter element with improved and durable corrosion resistance which contains on some of its surfaces a polymeric material durable bonded thereto. The essential novel features of the invention are apparent from the appended claims.

In accordance with the invention the filter element is a filter to be used in filtering solids containing flowing material in order to form a filter cake of solid material at least on one external surface area of the filter element. At least one part of the external surface area of the filter element separated from the external surface area for forming the filter cake is provided with at least one corrosion and heat resistant polymer-based material. The filter element itself can be manufactured of a porous ceramic material or for instance of a metal or a metal alloy material. The filter element itself can also be manufactured of a carbonic material. The filter element of the invention may preferably be applied for instance to a suction drier provided with a fine porous suction surface, where the radii of the fine pores of the suction surface are mainly within the range of 0.5–2 micrometers. The fine porous suction surface is the surface for forming the filter cake.

The filter element of the invention is a one-piece element or the filter element contains at least two parts which are bonded to each other. When using a one-piece element for the filter element of the invention the filter element is advantagenously covered with a corrosion and heat resistant polymer-based material on the outer surface area except on the part of the external surface where the filter cake is formed. Thus the corrosion and heat resistant material will cover the parts of the external surface area which have a contact with the frame of the filter element in order to compress the frame to the filter element. The filter element can also be provided with corrosion and heat resistant polymer-based material on the parts of the filter element which will surround the external surface area for forming the filter cake.

The filter element of the invention can also be made of at least two parts which are bonded to each other mechanically or chemically. Between the parts there can be a space where the filter medium is conducted in order to remove the filter medium from the filter element. The boundaries between these parts of the filter element are sensitive for corrosion and heat resistant and therefore, the surfaces of the filter elements with boundaries are provided with a polymer-based material having good resistance for corrosion and heat. The polymer-based material can also be used to compress areas of the parts of the filter element as well as to compress the filter element to the frame of the filter element.

The polymer-based material used in the invention consists essentially of thermoplastic polymeric material, fluoroplastic material and/or thermofusible polymeric material. It is preferred to utilize thermoplastic polymeric material. Among the thermoplastic polymers, the preferred polymers are optionally grafted halogenated or perhalogenated polyolefins. In one embodiment, the optionally grafted fluorinated and perfluorinated polyolefins are preferred. Fluoroplastics are a class of paraffinic polymers that have some or all hydrogen atoms replaced by fluorine. Such fluoroplastic materials include tetrafluoroethylene (TFE), fluorinated ethylenepropylene (FEP), ethylene-tetra-fluoroethylene copolymer (ETFE), perfluoroalkaloxy resin (PFA) and ethylenechlorotrifluoroethylene copolymer (ECTFE).

In accordance with the method of the invention structures consisting of thermoplastic material are formed by conventional means. Thus, for instance a thermoplastic resin in powdered form may be charged to a mold and heated. Once the structures for parts to be manufactured of thermoplastic material have been inserted into their appropriate places, they may be subjected to heat and pressure to bond them to the permeable ceramic substrate.

In one preferred embodiment of the invention, ethylene-tetrafluoroethylene (ETFE) is used. As is known to-those skilled in the art, ETFE is a predominantly 1:1 alternating copolymer of ethylene and tetrafluoroethylene which forms linear chains, it has a melting point of 270° C., and it has a density of 1.70 grams per cubic centimeter.

In another preferred embodiment of the invention, polyvinylidene fluoride (PVDF) is used. This material is a high-molecular weight polymer of vinylidene fluoride. It is a crystalline material with a melting point of 170° C. and a density of 1.78 grams per cubic centimeter.

When manufacturing the filter element of the invention a guiding means, as a jig or the like, may be used to attach the structures of thermoplastic material to the filter substrate. In the preferred embodiment spring-loaded bolts are adapted to hold the filter substrate assembly in place while simultaneously applying pressure thereto and allowing the assembly to be subjected to heat. It is also possible to use hydraulic or pneumatic or electric means to hold the filter substrate assembly in place. As will be apparent, the entire assembly within the guiding means may be placed in a suitable furnace.

The invention is explained in more detail below, with reference to the appended drawings where FIG. 1 is a perspective view of one preferred filter element of this invention, FIG. 2 is a sectional view of the filter element of FIG. 1, FIG. 3 is a top view of the apparatus for bonding a thermoplastic sleeve to a ceramic filter element.

FIG. 1 is a perspective view of one preferred filter element 21. Referring to the filter element 21, it will be seen that such filter element is comprised of a coated ceramic substrate assembly 22, a right edge seal 24, a top/upper edge seal 26, a left edge seal 28, a bottom/lower edge seal 38, a base seal 30 and an orifice 32. The edge seals 24, 26, 28 and 38 and the base seal 30 consist essentially of thermoplastic material. As illustrated in FIG. 2, the filter element 21 is also comprised of a plenum 40, a ceramic substrate 42, a ceramic substrate 44, and coatings 46, 48, 50 and 52.

A pressure is applied to the preformed polymeric structures to press them against the ceramic substrate assembly 22 while heating the entire assembly to a temperature sufficient to melt the thermoplastic. In general, a pressure of at least 0.5 bar is applied to at least edge seals 24, 26, 28, and 38.

The temperature used is enough to melt at least portion of the thermoplastic articles. In general, a temperature of at least about 120° C. is required, and it is preferred to use a temperature of at least about 150° C. In one embodiment, a temperature between from about 240° C. and 270° C. is used.

FIG. 3 shows a top view of a jig 60 which may be used to attach the structures of thermoplastic material to the ceramic substrate assembly 22. The spring-loaded bolts 62, 64, 66, 68, 70, 72, 74 and 76 are adapted to hold the ceramic substrate assembly in place while simultaneously applying pressure thereto and allowing the assembly to be subjected to heat. As will be apparent, the entire assembly within the jig may be placed in a suitable furnace.

What is claimed is:

1. Filter element with improved corrosion and heat resistance and structural properties, to be used in filtering solids containing material, in order to achieve a filter cake of solid material on at least one external surface area of the filter element, the filter element being enclosed within a frame, the filter element being provided with a plenum for removal of filtrate from the filter element, at least one corrosion and heat-resistant polymer based material being bonded to and covering areas that surround an external surface area on which the filter cake is formed and an external surface area of the filter element which is in contact with the frame of the filter element, the heat resistant polymer based material not covering and not being bonded to the external surface area of the filter element on which the filter cake is formed, the corrosion and heat resistant polymer-based material sealing the edges of the filter element and compressing the frame to the filter element, the polymer-based material being capable of maintaining said bonding when exposed to a corrosive acidic environment, wherein the filter element is capable of being attached to a suction dryer, such that elimination of filtrate to the suction dryer occurs through a single orifice, the filtrate entering the plenum and subsequently being conducted through the orifice, and wherein the filter element is provided with a fine porous suction surface, where radii of the fine pores of the suction surface are mainly within the range of 0.5 to 2 micrometers.

2. Filter element according to claim 1, wherein the filter element is made of at least two separate parts which are bonded to each other and the polymer-based material is a bonding material for the separate parts of the filter element.

3. Filter element according to claim 2, wherein the polymer-based material consists essentially of thermoplastic polymeric material.

4. Filter element according to claim 2, wherein the polymer-based material consists essentially of grafted halogenated polyolefins.

5. Filter element according to claim 2, wherein the polymer-based material consists essentially of grafted perhalogenated polyolefins.

6. Filter element according to claim 2, wherein the polymer-based material consists essentially of fluoroplastic material.

7. Filter element according to claim 2, wherein the polymer-based material consists essentially of thermofusible polymeric material.

8. Filter element according to claim 2, wherein the filter element is made of a ceramic material.

9. Filter element according to claim 2, wherein the filter element is made of a metallic material.

10. Filter element according to claim 2, wherein the filter element is made of a carbonic material.

11. A filter element as claimed in claim 2, wherein said corrosive acidic environment comprises concentrated sulfuric acid at a temperature in excess of 90° C.

12. A filter element as claimed in claim 2, wherein said corrosive acidic environment comprises concentrated nitric acid at a temperature in excess of 90° C.

13. Filter element according to claim 1, wherein the polymer-based material consists essentially of thermoplastic polymeric material.

14. Filter element according to claim 1, wherein the polymer-based material consists essentially of grafted halogenated polyolefins.

15. Filter element according to claim 1, wherein the polymer-based material consists essentially of grafted perhalogenated polyolefins.

16. Filter element according to claim 1, wherein the polymer-based material consists essentially of fluoroplastic material.

17. Filter element according to claim 1, wherein the polymer-based material consists essentially of thermofusible polymeric material.

18. Filter element according to claim 1, wherein the filter element is made of a ceramic material.

19. Filter element according to claim 1, wherein the filter element is made of a metallic material.

20. Filter element according to claim 1, wherein the filter element is made of a carbonic material.

21. The filter element of claim 1, wherein said corrosive acidic environment comprises concentrated sulfuric acid at a temperature in excess of 90° C.

22. The filter element of claim 1, wherein said corrosive acidic environment comprises concentrated nitric acid at a temperature in excess of 90° C.

* * * * *